J. N. GOODALL.
PIPE COUPLING.
APPLICATION FILED AUG. 19, 1915.
1,234,537.
Patented July 24, 1917.
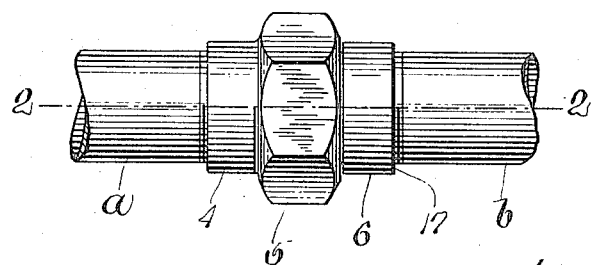
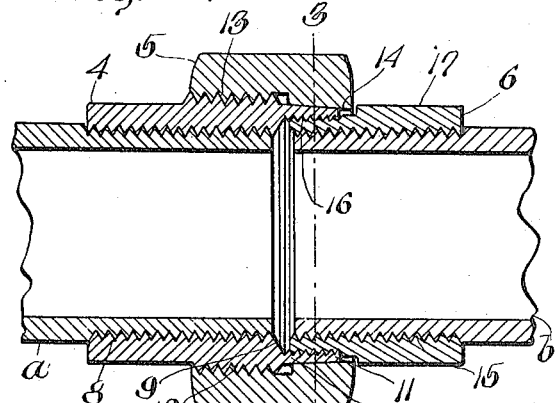
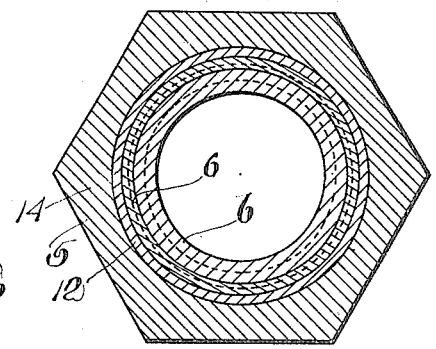
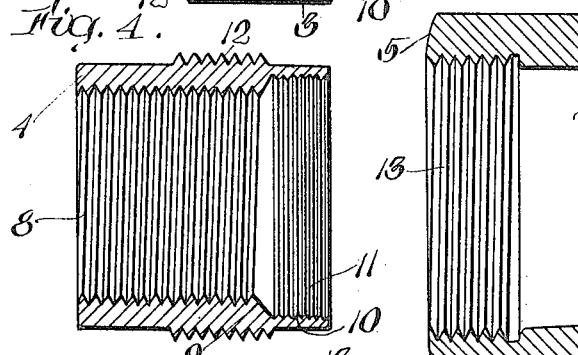
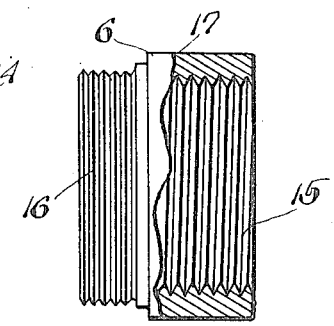
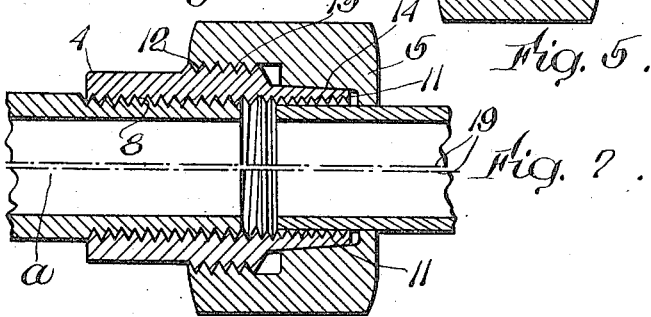
Inventor:
John N. Goodall
By Henry J. Miller

UNITED STATES PATENT OFFICE.

JOHN N. GOODALL, OF MELROSE HIGHLANDS, MASSACHUSETTS.

PIPE-COUPLING.

1,234,537. Specification of Letters Patent. Patented July 24, 1917.

Application filed August 19, 1915. Serial No. 46,369.

*To all whom it may concern:*

Be it known that I, JOHN N. GOODALL, a citizen of the United States, residing at Melrose Highlands, in the county of Middlesex and State of Massachusetts, have invented certain new and useful Improvements in Pipe-Couplings, of which the following is a specification, reference being had to the accompanying drawings, forming part thereof.

This invention has reference to improvements in pipe couplings and particularly in such couplings in which one member has a compressible element adapted to be secured by compression to another member.

One object of the invention is to so construct a coupling of this nature that two of the members may be secured in interlocking relation by reason of a compression of the compressible member.

Another object of this invention is to provide a novel coupling having a pair of interlocking members which may be relatively rotatable when interlocked.

Other objects of the invention will appear from the following description.

The invention consists in the construction of the compression member.

The invention also consists in the construction of the interlocking members.

The invention still further consists in such other novel features of construction and combination of parts as shall hereinafter be more fully described and pointed out in the claims.

Figure 1, represents a view in elevation of the improved coupling and the end portions of two pipes connected by said coupling.

Fig. 2, represents an enlarged sectional view taken on line 2—2 Fig. 1.

Fig. 3, represents a similar view taken on line 3—3 Fig. 2.

Figs. 4 and 5 represent sectional views respectively of the compressible member and of the compressor member as taken on line 2—2 Fig. 1.

Fig. 6, represents a view in elevation of one of the coupling members, parts thereof being broken away to show other parts in section.

Fig. 7, illustrates a sectional view as on line 2—2 Fig. 1 of a modified arrangement in which but a single compression coupling member is used with the compressor member.

Similar characters of reference designate corresponding parts throughout.

This invention as illustrated in the drawings in its preferred form comprises three members 4, 5 and 6 respectively. Member 4 is cylindrical in shape and has the main screw threaded bore 8 terminating at the annular enlarging shoulder 9 from which extends the integral comparatively thin compression sleeve or member 10 having at its interior a series of parallel grooves 11 of any desired cross sectional shape alternating with suitably shaped parallel ribs. At its exterior this compression member 10 is smooth and tapers toward its end and said end is spaced from the screw thread 12 which embraces the main screw threaded bore 8 and is of greater diameter than the main diameter of the compression member 10.

Member 5 is shaped exteriorly to be engaged by a suitable wrench or tool and has the main screw threaded bore 13 adapted to engage the screw thread 12 of member 4 and spaced from said screw threaded bore 13 is the tapering compressor bore 14 adapted to be drawn into compressive relation with the outer surface of the compression sleeve 10 of member 4 by the screwing of the threaded bore 13 of this member 5 onto said screw thread 12.

Member 6 has the main screw threaded bore 15 preferably of a diameter similar to that of bore 8 of member 4 and for at least a portion of its length the wall of this member 6 is a thickness approximating the dimension of shoulder 9 whereby the series of alternating parallel grooves and ribs 16 on the exterior of this member 6 may be slidably received within the complemental ribs and grooves 11 of the compression member 10. Preferably this member 6 has the enlarged shoulder 17 but this is not necessary unless it is desired to increase the thickness of the wall of this member at this point.

Before assembling the members of this improved coupling I prefer to supply the grooves 11 of member 4 or the similar grooves 16 of member 6 with graphite or some similar heavy and preferably mineral lubricant. It is of course to be desired that the exterior of the grooved portion of member 6 should fit closely the grooved interior of compression member 10 so that in effect comparatively little compression of this member 10 is necessary to effect the interlocking of the complemental ribs and grooves of these members.

In the assembling of the members as shown the threaded portion 16 of member 6 is inserted through the tapering bore of member 5 and is then inserted in compression member 10; the screw thread 13 of the compressor member 5 is then engaged with the exterior screw thread 12 of member 4 and is screwed thereon until the tapering bore 14 of member 5 acting on the tapering exterior of compression member effects sufficient compression of this member 10 to effect the interlocking of its inner parallel ribs and grooves with the similar exterior ribs and grooves of the member 6. At some point in the operation the pipes *a* and *b* are screwed into the main bores of the members 4 and 6.

The modified construction of this improved coupling shown in Fig. 7 is similar to that above described with the exception that the bore of member 4 is preferably of the same diameter throughout its length having for a portion of its length the screw thread 8 and for another portion of its length the series of parallel alternating ribs and grooves 18. In this modified form the pipe *a* is screwed into the bore of member 4 but the pipe 19 having a smooth exterior is substituted for member 6 and the compression of member 10 by the tapering bore of member 5 effects the forcing of the edges of the ribs 11 into the surface of the pipe 19.

While I have shown the parallel ribs and grooves 11 of compression member 10 substantially in intimate contact with the ribs and grooves 16 of member 6 it is to be understood that such intimate contact at all points is not necessary to effect a substantially tight joint particularly when the graphite or other somewhat similar packing is supplied between these points. A reasonably tight joint may be effected by the side bearing of the ribs 11 of member 10 against the ribs 16 of member 6. Nor is it my intention to limit this invention to any particular cross sectional shape of said ribs and grooves 11 and 16 nor need such ribs and grooves of member 6 be similar in cross sectional shape to those of member 10 for, in some cases, this coupling is sufficiently effective if the parallel ribs of members 6 are interlocked or engaged with the ribs 11 of member 10.

Neither do I intend to limit my invention necessarily to the use of the compressor member 5 as I am aware that the compression member 10 may be compressed by other means which means may be removed after the member 10 has set in the compressed position.

Having thus described my invention I claim as new and desire to secure by Letters Patent.

1. A coupling comprising a pair of tubular members having screw threaded bores and coöperating ends furnished with engageable annular ribs and alternating grooves, one of said members having its said ribs and grooves formed in a comparatively thin compressible wall and having at its periphery a screw thread, and an exterior nut having a tapering bore adapted to bear against the end of said tapering wall and an inner screw thread to engage said peripheral thread of said member.

2. A coupling comprising a tubular member having an exterior screw thread and an exterior smooth tapering wall, the bore of said tapering end having a series of parallel grooves and ribs, a second tubular member having a screw threaded bore and having its exterior furnished with parallel grooves and ribs and of a diameter to be received by said grooved bore of said first member, and a nut having a tapering bore and a screw thread spaced from said bore and adapted to engage the exterior thread of said first mentioned member.

3. A coupling comprising a tubular member having an exterior screw thread and a smooth tapering end, the bore of said member enlarged at said tapering end thereof and having a series of alternating parallel grooves and ribs, the smaller diameter of said bore having a screw thread, a second tubular member having a screw threaded bore substantially of the diameter of the threaded bore of said first member and having an exterior adapted to be received by the grooved bore of said first member and having at such exterior a series of alternating parallel grooves and ribs, and a compression nut having a tapering bore to act against said tapering end and a screw thread to engage the exterior screw thread of said first member.

JOHN N. GOODALL.

Copies of this patent may be obtained for five cents each, by addressing the "Commissioner of Patents, Washington, D. C."